US005270370A

United States Patent [19]
Chilles et al.

[11] Patent Number: 5,270,370
[45] Date of Patent: Dec. 14, 1993

[54] RED PHOSPHORUS

[75] Inventors: Colin A. Chilles, Bloxwich; Tom Dutton, Edgbaston; Mohsen Zakikihani, Kidderminster; Simon J. Oakley, Sutton Coldfield, all of England

[73] Assignee: Albright & Wilson Limited, Warley, England

[21] Appl. No.: 948,016

[22] Filed: Sep. 21, 1992

[30] Foreign Application Priority Data

Sep. 19, 1991 [GB] United Kingdom ................ 9119992

[51] Int. Cl.$^5$ .......................... C08K 5/32; C08K 5/07; C08K 9/04

[52] U.S. Cl. .................................... 524/260; 423/268; 423/274; 423/322; 524/80; 524/205; 524/226; 524/300; 524/319; 524/355

[58] Field of Search ............... 524/260, 205, 226, 355, 524/319, 300, 380, 80; 423/322, 274, 268

[56] References Cited

U.S. PATENT DOCUMENTS

| | | | |
|---|---|---|---|
| 3,943,194 | 3/1976 | Dany et al. | 524/80 |
| 4,012,343 | 3/1977 | Raley | 524/80 |
| 4,092,460 | 5/1978 | Cerny et al. | 524/80 |
| 4,211,853 | 7/1980 | Raley | 524/80 |
| 4,255,319 | 3/1981 | Peters | 524/355 |

FOREIGN PATENT DOCUMENTS

| | | |
|---|---|---|
| 01-02807 | 6/1984 | Japan . |
| 1634632 | 3/1991 | U.S.S.R. . |

*Primary Examiner*—Veronica P. Hoke
*Attorney, Agent, or Firm*—Frishauf, Holtz, Goodman & Woodward

[57] ABSTRACT

Evolution of phosphine from red phosphorus is reduced by means of acyclic, aliphatic compounds having at least one carbon-to-carbon double bond, in the alpha-position relative to an electron-withdrawing group. A preferred example of such a compound is trans-cinnamaldehyde.

18 Claims, No Drawings

RED PHOSPHORUS

This invention relates to red phosphorus and in particular to a method for reducing the emission of phosphine therefrom.

The present invention also relates to red phosphorus treated by the said method, to masterbatches comprising treated red phosphorus or including red phosphorus and compounds of the invention, and to polymeric compositions containing flame-retardant quantities of red phosphorus (generally 1–20%), either as pretreated red phosphorus, or with masterbatches, or by the addition of compounds of the invention during processing.

Red phosphorus is well known per se as a flame retardant for polymeric materials. However, red phosphorus, even at ambient temperatures, tends to decompose slowly, with the emission of phosphine. At the temperatures at which many polymeric materials are processed, even more phosphine will be evolved. Atmospheric oxidation of red phosphorus tends to give phosphorus acids, hydrogen and phosphine as decomposition products, of which phosphine is the most hazardous (having a TLV of 0.3 ppm in the USA).

Attempts have been described to reduce the emission of phosphine from red phosphorus by treating the phosphorus with carbonyl compounds. Reactions of phosphorus with compounds containing unsaturated carbon-to-carbon bonds are also known but require the additional use of a free-radical initiator before effective combination with the phosphine can be achieved. This use of a free-radical initiator would lead to cross-linking and degradation of polymers during processing.

Masterbatches, comprising red phosphorus and a polymeric material, are widely used in the electrical industry, especially for further processing (e.g., as sheathing for cable). The masterbatches are supplied in bulk and stored until ready for use. It is therefore important, both for economic and for environmental reasons, that the evolution of phosphine from the red phosphorus contained in the masterbatches is kept to a minimum.

We have unexpectedly found that acyclic, aliphatic compounds containing at least one carbon-to-carbon double bond in the alpha - position relative to at least one electron-withdrawing group, are effective in minimising the evolution of phosphine from red phosphorus.

Accordingly, the present invention provides a method of reducing the emission of phosphine from red phosphorus, the method comprising adding to the red phosphorus an acyclic, aliphatic compound having one or more carbon-to-carbon double bonds, at least one of said double bonds being in the alpha - position relative to an electron - withdrawing group.

The present invention also provides red phosphorus treated by the method described in the immediately - preceding paragraph.

The present invention further provides phosphine-suppressed flame-retardant compositions comprising red phosphorus treated according to the aforesaid method and polymeric materials.

The present invention yet further provides a method of making flame-retardant compositions as herein described.

According to the present invention, the electron - withdrawing group may be a carbonyl group or a thio group, for example aldehyde, thioaldehyde, ketone, thioketone, carboxylic acid, thioacid, carboxylic acid anhydride, thioacid anhydride, carboxylic ester or thioester.

Alternatively the electron - withdrawing group may be halogen, nitrile, nitro, ether or thioether.

As stated hereinabove, the compound used for the treatment of red phosphorus has at least one carbon-to-carbon double bond in the alpha - position relative to an electron - withdrawing group and a particularly preferred example of such a compound is trans - cinnamaldehyde.

Suitably, the compound used to treat the red phosphorus is added to the red phosphorus in an amount of from 0.1% to 100% by weight, preferably 5% by weight.

Masterbatches according to the present invention may suitably comprise a polymer containing 20% to 80% by weight of red phosphorus, preferably 50% by weight.

Suitable polymeric materials include thermoplastics and thermosetting materials. Suitable thermoplastics materials include polyethylene, polypropylene, polystyrene, high-impact polystyrene, acrylonitrile/-butadiene/styrene terpolymers, styrene/butadiene/styrene terpolymers and styrene/butadiene copolymers. Alternatively, polyamides, polyesters, acrylates and vinylic polymers may be used as the thermoplastics materials. Suitable thermosetting materials include epoxies, phenolics, polyurethanes, urea-formaldehyde polymers and polyureas.

Preferred embodiments of the present invention will be illustrated by way of the following Examples.

EXAMPLE 1

Phosphine Suppression of Red Phosphorus Powder

In each case, 1 g of red phosphorus was mixed with 1 g of suppressant. The mixture was sealed in a 250-ml conical flask fitted with a gas-sampling septum. Humidity was controlled to about 70% in the flask by the inclusion of a test-tube containing a saturated mixed-salt solution of ammonium chloride and potassium nitrate. The phosphine level in the flask was measured after 14 days by gas head-space analysis on a Gas Chromatograph fitted with a Flame Photometric Detector. Calibration was against a cylinder of a known concentration of phosphine in nitrogen.

| Ex. No. | Description | Relative Phosphine (%) |
|---|---|---|
| 1.1 | Red Phosphorus Control | 100 |
| 1.2 | 1.1 + CROTONALDEHYDE | 0 |
| 1.3 | 1.1 + METHYL METHACRYLATE | 54.9 |
| 1.4 | 1.1 + alpha-CHLOROCINNAMALDEHYDE | 0 |
| 1.5 | 1.1 + CINNAMOYL CHLORIDE | 5.8 |
| 1.6 | 1.1 + CINNAMAMIDE | 64.7 |
| 1.7 | 1.1 + CINNAMONITRILE | 19.6 |
| 1.8 | 1.1 + 2-NITROCINNAMALDEHYDE | 1.8 |
| 1.9 | 1.1 + CITRAL | 1.4 |
| 1.10 | 1.1 + alpha-AMYLCINNAMALDEHYDE | 4.5 |
| 1.11 | 1.1 + alpha-METHYL-trans-CINNAMALDEHYDE | 3.6 |
| 1.12 | 1.1 + 2,4-HEXADIENAL | 0.06 |
| 1.13 | 1.1 + 3-METHYL-2-BUTENAL | 0.34 |
| 1.14 | 1.1 + trans, trans-DIBENZYLIDENEACETONE | 14.6 |
| 1.15 | 1.1 + 2-ETHYL-trans-2-BUTENAL | 0.44 |
| 1.16 | 1.1 + CINNAMYL CHLORIDE | 0.56 |
| 1.17 | 1.1 + 4-PHENYL-3-BUTEN-2-ONE | 9.0 |
| 1.18 | 1.1 + trans-3-PENTEN-2-ONE | 4.4 |
| 1.19 | 1.1 + trans-2-METHYL-2-BUTENAL | 0.56 |

-continued

| Ex. No. | Description | Relative Phosphine (%) |
|---|---|---|
| 1.20 | 1.1 + trans-CINNAMALYDEHYDE | 0.22 |

EXAMPLE 2

Phosphine Suppression of Red Phosphorus Masterbatch 7.5 g of suppressant was added to 150 g of red phosphorus and mixed thoroughly. 150 g of low density polyethylene (LDPE); (mfi=7); was added. The mixture was stirred and extruded through a 25/25 single-screw extruder fitted with a cavity transfer mixer. The masterbatch was pelletised and phosphine was monitored by placing 1 g of masterbatch in a 250-ml flask as in Example 1 above.

| | | elative Phosphine (%) |
|---|---|---|
| 2.1 | Red Phosphorus Control | 100 |
| 2.2 | 2.1 + trans-CINNAMALDEHYDE | 3.7 |

EXAMPLE 3

Phosphine Suppression of Flame Retardant Polymeric Composition 160 g of masterbatch as in Example 2 above was added to 840 g of LDPE (mfi=7) and injection-moulded to give test specimen bars, each about 8.4 g in weight. A bar was cut in half and placed in a 250-ml flask for phosphine monitoring as in Example 1 above.

| | | elative Phosphine (%) |
|---|---|---|
| 3.1 | Red Phosphorus Control | 100 |
| 3.2 | 3.1 + trans-CINNAMALDEHYDE | 8.3 |

EXAMPLE 4

Phosphine Suppression using a Carrier for the Suppressant 2.5 g of trans-CINNAMALDEHYDE was dissolved in 10 g of acetone and soaked into 5 g of carbon black. Acetone was evaporated off. The treated carbon black was then processed into low-density polyethylene (MFI=7) and tested for phosphine as in Example 2 and 3 above.

| | | elative Phosphine (%) |
|---|---|---|
| 2.1 | Red Phosphorus Control - Masterbatch | 100 |
| 4.1 | trans-CINNAMALDEHYDE/ Carbon Black Masterbatch | 7.4 |
| 3.1 | Red Phosphorus Control - Polymeric Composition | 100 |
| 4.2 | trans-CINNAMALDEHYDE/ Carbon Black Flame Retardant Polymeric Composition | 8.3 |

We claim:

1. A method for reducing the emission of phosphine from red phosphorus, said method comprising contacting red phosphorus with an acyclic, aliphatic compound and wherein said acyclic, aliphatic compound is trans-cinnamaldehyde.

2. The method of claim 1, wherein said acyclic, aliphatic compound is added to said red phosphorus in an amount of from 0.1% to 100% by weight.

3. The method of claim 2, wherein said acyclic, aliphatic compound is added to the said red phosphorus in an amount of about 5% by weight.

4. A phosphine-suppressed flame-retardant composition comprising a polymeric material and red phosphorus treated according to the method of claim 1.

5. The composition of claim 4, said composition comprising from 20% to 80% by weight of said red phosphorus and correspondingly from 80% to 20% by weight of said polymeric material.

6. The composition of claim 5, said composition comprising 50 parts by weight of said polymeric material and 50 parts by weight of said red phosphorus.

7. The composition of claim 4, wherein said polymeric material is selected from polyethylene, polypropylene, polystyrene, high-impact polystyrene, acrylonitrile/butadiene/styrene terpolymers, styrene/-butadiene/styrene terpolymers and styrene/butadiene co-polymers.

8. The composition of claim 4, wherein said polymeric material is selected from polyamides, polyesters, acrylates and vinylic polymers.

9. The composition of claim 4, wherein said polymeric material is selected from epoxy-resins, phenolic-resins, polyurethane-resins, urea/formaldehyde resins and polyureas.

10. A method for reducing the emission of phosphine from red phosphorus, said method comprising contacting red phosphorus with an acyclic, aliphatic compound having at least one carbon-to-carbon double bond, at least one of said double bonds being in the alpha-position relative to an electron-withdrawing entity, said compound being selected from the group consisting of crotonaldehyde, alpha-chlorocinnamaldehyde, cinnamoyl chloride, 2-nitrocinnamaldehyde, citral, alpha-amylcinnamaldehyde, alpha-methyl-trans-cinnamaldehyde, 2,4-hexadienal, 3-methyl-2-butenal, 2-ethyl-trans-2-butenal, cinnamyl chloride, trans-2-methyl-2-butenal, trans-cinnamaldehyde and trans-3-penten-2-one.

11. The method of claim 10, wherein said acyclic, aliphatic compound is added to red phosphorus in an amount of from 0.1% to 100% by weight.

12. The method of claim 11, wherein said acyclic, aliphatic compound is added to the red phosphorus in an amount of about 5% by weight.

13. A phosphine-suppressed flame-retardant composition comprising a polymeric material and red phosphorus treated according to the method of claim 10.

14. The composition of claim 13, comprising from 20% to 80% by weight of said red phosphorus and correspondingly from 80% to 20% by weight of said polymeric material.

15. The composition of claim 14, comprising 50 parts by weight of said polymeric material and 50 parts by weight of said red phosphorus.

16. The composition of claim 13, wherein said polymeric material is selected from the group consisting of polyethylene, polypropylene, polystyrene, high-impact polystyrene, acrylonitrile/butadiene/styrene terpolymers, styrene/butadiene/styrene terpolymers and styrene/butadiene co-polymers.

17. The composition of claim 13, wherein said polymeric material is selected from polyamides, polyesters, acrylates and vinylic polymers.

18. The composition of claim 13, wherein said polymeric material is selected from epoxy resins, phenolic resins, polyurethane resins, urea/formaldehyde resins and polyureas.

* * * * *